US005971129A

United States Patent [19]

Stawniak et al.

[11] Patent Number: 5,971,129

[45] Date of Patent: Oct. 26, 1999

[54] CONVEYOR BELT FOR PERSONS

[75] Inventors: Andrzej Stawniak, Vienna; Harald Nusime, Laxenburg, both of Austria

[73] Assignee: Inventio AG, Hergiswic NW., Switzerland

[21] Appl. No.: 09/000,580

[22] Filed: Dec. 30, 1997

[30] Foreign Application Priority Data

Jan. 17, 1997 [EP] European Pat. Off. .............. 97810021

[51] Int. Cl.[6] .................................................... B65G 15/00

[52] U.S. Cl. .......................... 198/325; 198/324; 198/334

[58] Field of Search .................................... 198/324, 325, 198/334, 600, 539

[56] References Cited

U.S. PATENT DOCUMENTS

| | | | |
|---|---|---|---|
| 2,624,444 | 1/1953 | Casabona | 198/600 |
| 3,071,234 | 1/1963 | Moore et al. | 198/325 |
| 3,144,117 | 8/1964 | Fabula et al. | 198/325 |
| 5,215,182 | 6/1993 | Garbagnati | 198/325 |
| 5,234,095 | 8/1993 | Patin | 198/324 |
| 5,769,201 | 6/1998 | Dwight et al. | 198/325 |

FOREIGN PATENT DOCUMENTS

| | | | |
|---|---|---|---|
| 290255 | 11/1988 | European Pat. Off. | 198/324 |
| 0 509 861 | 10/1992 | European Pat. Off. . | |
| 0 685 421 | 12/1995 | European Pat. Off. . | |
| 2 693 446 | 1/1994 | France . | |
| 2 706 880 | 12/1994 | France . | |
| 376080 | 5/1923 | Germany | 198/600 |
| 28 27 249 | 1/1979 | Germany . | |
| 313253 | 12/1989 | Japan | 198/600 |
| 404345497 | 12/1992 | Japan | 198/325 |
| 405246678 | 9/1993 | Japan | 198/325 |
| 523019 | 8/1976 | Switzerland | 198/325 |

*Primary Examiner*—William E. Terrell
*Assistant Examiner*—Khoi H. Tran
*Attorney, Agent, or Firm*—MacMillan, Sobanski & Todd, LLC

[57] ABSTRACT

A conveyor belt (1) for persons includes several sections (2, 3, 4, 5, 6) with a first section (2) and a second section (3) forming an acceleration portion (7), in which the persons to be transported are accelerated from a low initial speed, which is unproblematic for stepping onto the conveyor belt (1) for persons, to a constant transport speed of a main portion (8) formed by a third section (4). Connected downstream of the main section (8) is a retardation portion (9), which is formed by means of a fourth section (5) and a fifth section (6) and in which the persons to be transported are retarded from the transport speed to a low final speed, which is unproblematic for departure from the conveyor belt (1) for persons. Arranged at each section transition is a respective transition device (10) having a roller (20, 20.11, 36, 37) by means of which the persons are guided free of risk from one section to the other.

15 Claims, 5 Drawing Sheets

CONVEYOR BELT FOR PERSONS

BACKGROUND OF THE INVENTION

The present invention relates generally to moving walkways and, in particular, to a conveyor belt for persons, comprising at least two sections and a transition device which is arranged between the sections and which enables the transport of persons and objects from one section to the other section.

A conveyor belt for persons with acceleration portions and retardation portions, which portions make it possible for persons to overcome the transition state from a speed of zero to a nominal transport speed of the conveyor belt for persons and conversely, is shown in the German published patent document DE 28 27 249. Shaped parts form continuous transport surfaces between the portions, in that solid zones and hollow zones of the shaped parts engage in grooves or in ribs of the conveyor belts of the portions.

The shaped part necessary for bridging over two adjacent portions is of such a size that small shoe sizes, for example children's shoes or pointed heels of ladies' shoes, find room on the shaped part. Because the movement of the person to be transported is thereby disturbed at the shaped part, a substantial risk of accident exists.

SUMMARY OF THE INVENTION

The present invention concerns a conveyor belt for persons including at least two adjacent sections for transporting persons and objects from one of the sections to an adjacent one of the sections in a direction of travel. A transition device positioned between the one section and the adjacent section includes at least one rotatable roller extending traverse to the direction of travel whereby shoes of every size of persons to be transported and objects roll upon the roller from the one section to the adjacent section.

Here the invention provides a remedy to the disadvantages of the prior art conveyor belt. The invention meets the object of avoiding the disadvantages of the known device and of creating a transition device for a conveyor belt, which consists of at least two sections, for persons, by means of which device the persons and objects to be transported are guided with disturbance-free movement from one section to the other.

The advantages achieved by the invention are to be seen essentially in that the sections with increased speeds can be moved to without risk at the section transitions for the persons to be transported. At acceleration and retardation portions of the conveyor belt for persons, the speed difference between the sections can be increased without risk for the persons to be transported thanks to the transition device according to the invention, because a gentle transition of shoes of all shoe sizes and objects at the transition device is possible.

BRIEF DESCRIPTION OF THE DRAWINGS

The above, as well as other advantages of the present invention, will become readily apparent to those skilled in the art from the following detailed description of a preferred embodiment when considered in the light of the accompanying drawings in which.

DESCRIPTION OF THE PREFERRED EMBODIMENT

Figure 1:
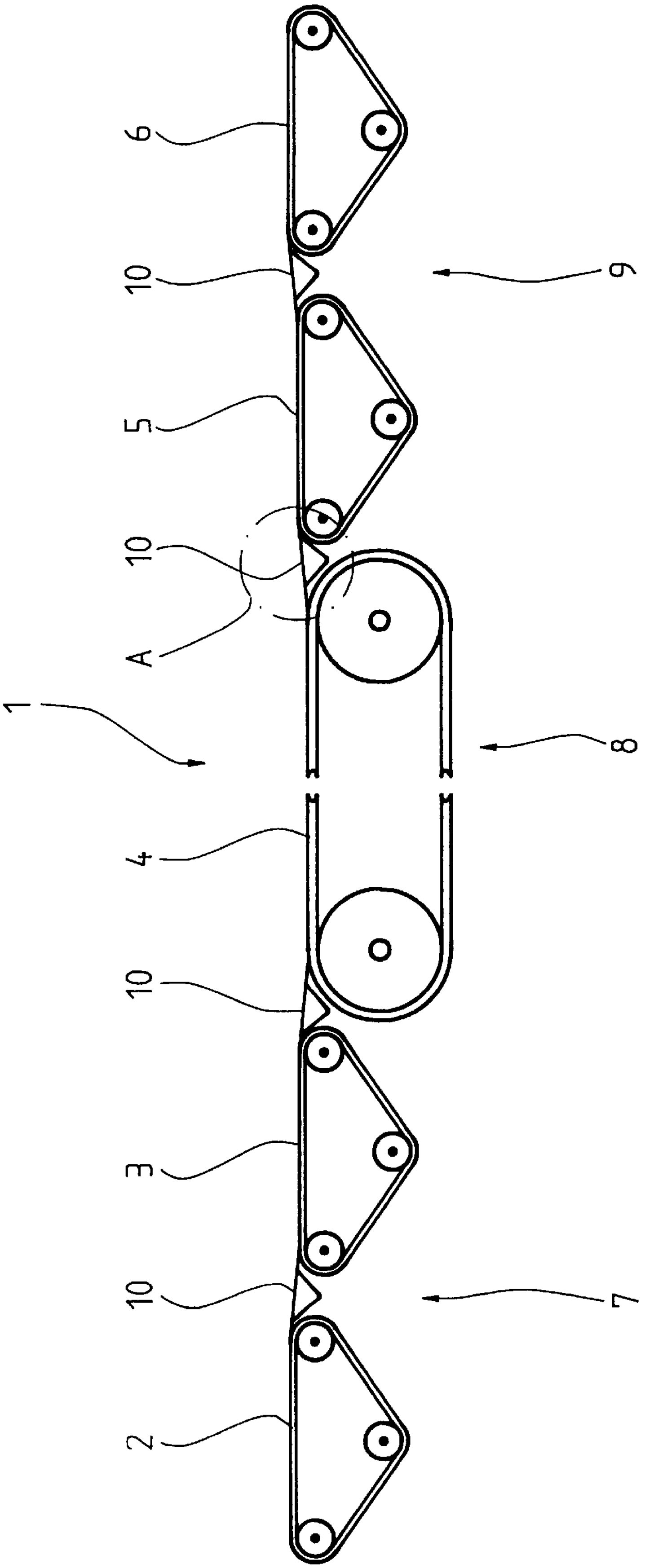
FIG. 1 is a front elevation view of a conveyor belt for persons, consisting of several sections with an acceleration portion, a portion with constant speed and a retardation portion, in accordance with the present invention.

In the FIGS. 1 to 5 there is shown a conveyor belt 1 for persons comprising a first section 2, a second section 3, a third section 4, a fourth section 5 and a fifth section 6. The first section 2 and the second section 3 form an acceleration portion 7, in which portion the persons and objects to be transported are accelerated from a low initial speed, which is unproblematic for stepping onto the conveyor belt 1 for persons, to a constant transport speed of a main portion 8 formed by means of the third section 4. Connected downstream of the main portion 8 is a retardation portion 9, which retardation portion is formed by means of the fourth section 5 and the fifth section 6 and in which the persons and objects to be transported are retarded from the transport speed to a low final speed, which is unproblematic for departure from the conveyor belt 1 for persons. A respective transition device 10, by means of which the persons are guided free of risk from one section to the other, is arranged at each of the section transitions. The conveyor belt 1 for persons can also consist of several sections which are operated at the same speed.

Figure 2:
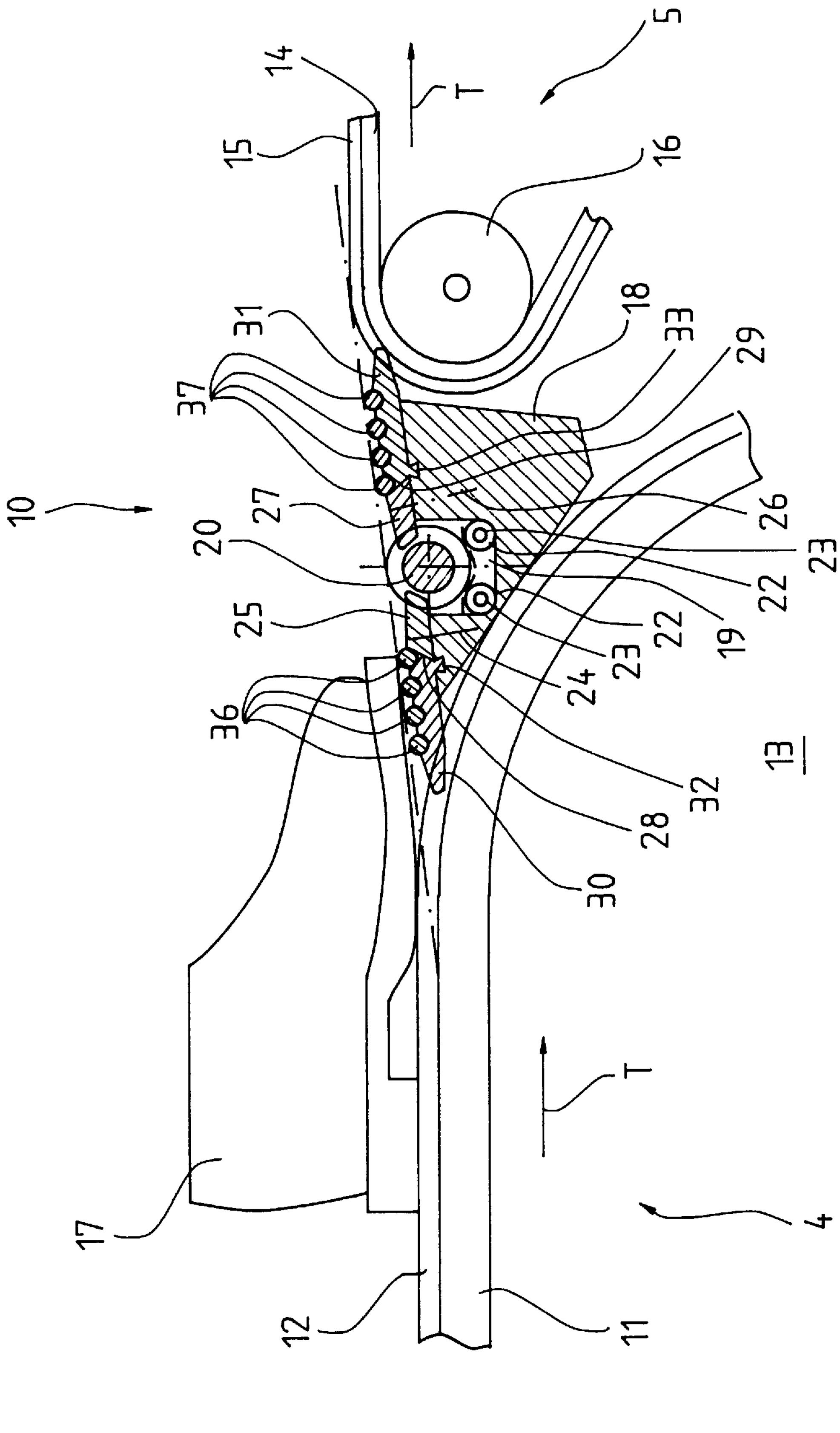
FIG. 2 is a view in partial cross-section taken along the line B—B in the FIG. 3 showing the transition device according to the invention between two sections.

The FIG. 2 shows a detail (area A of the FIG. 1) of the conveyor belt 1 for persons illustrated in the FIG. 1 with the third section 4, which section runs into the transition device 10 and consists of a first belt 11 with a plurality of first ribs 12 and a first deflecting wheel 13, as well as with the fourth section 5, which runs out of the transition device 10 and consists of a second belt 14 with a plurality of second ribs 15 and a second deflecting wheel 16. A shoe 17 of a person to be transported in a direction of travel T is shown on the transition device 10 between the third section 4 and the fourth section 5. A support 18, which extends in the section width, of the transition device 10 has a recess 19 formed therein in which are arranged a first comb roller 20 and, as shown in the FIG. 4, a second comb roller 20.11. The first comb roller 20 is provided with first discs 21 (FIG. 3) and the second comb roller 20.11 is provided with second discs 21.11 (FIG. 5) and these rollers are driven and rotate at a speed which lies between the speed of the third section 4 and the speed of the fourth section 5.

Figure 3:
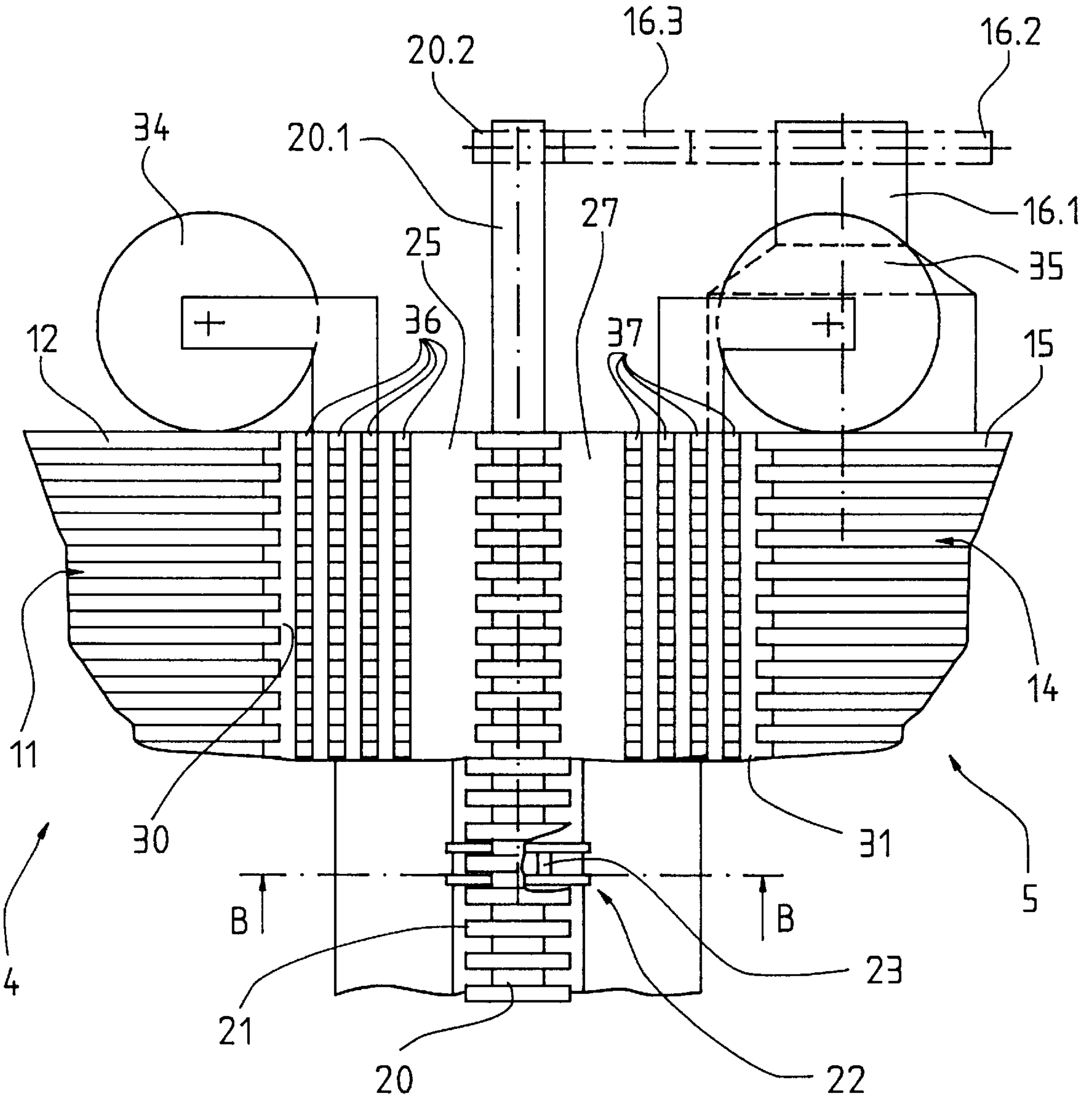
FIG. 3 is a plan view of the transition device shown in the FIG. 1.
Figure 5:
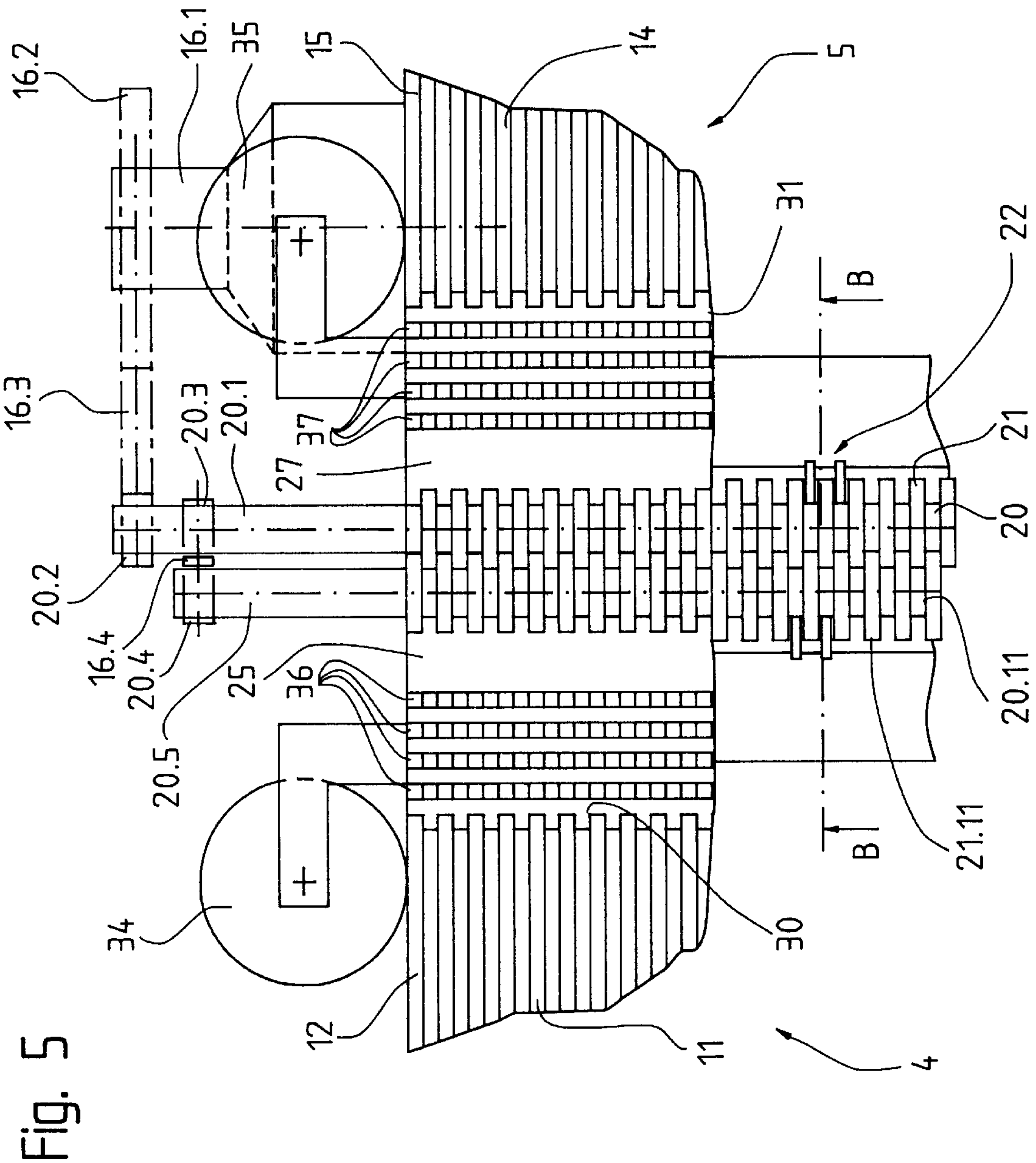
FIG. 5 a plan view of the transition device shown in the FIG. 3.

The FIG. 3 and the FIG. 5 show an example for the drive of the first comb roller 20 and the second comb roller 20.11 respectively. A first gearwheel 16.2, that drives a toothed belt 16.3, is arranged at a first axle 16.1 of the second deflecting wheel 16. The movement of the toothed belt 16.3 is transmitted to a second gearwheel 20.2 arranged at a second axle 20.1 of the first comb roller 20. A third gearwheel 20.3, that stands in connection by means of a further toothed belt 16.4 with a fourth gearwheel 20.4 of a third axle 20.5 of the second comb roller 20.11, is arranged at the second axle 20.1.

Pins 23 held by bearings 22 support the first comb roller 20 and the second comb roller 20.11 at the discs 21 and the discs 21.11, respectively. A second comb 25 fastened by means of first screws 24 to the support 18 is arranged at the side of the third section 4 and a third comb 27 fastened by means of second screws 26 to the support 18 is arranged at the side of the fourth section 5. On the one hand the combs 25 and 27 mesh between the first discs 21 of the first comb roller 20 or between the second discs 21.11 of the second comb roller 20.11 and on the other hand the combs 25 and 27 serve by their end faces 28 and 29 as slide bearings for a first comb 30 and a fourth comb 31 respectively. At the belt side, the combs 30 and 31 mesh between the first ribs 12 and between the second ribs 15, respectively. Apart from at the end faces 28 and 29 of the combs 25 and 27, the combs 30 and 31 are also displaceably borne in dovetail grooves 32 and 33.

At the side, the combs 30 and 31 are each connected with at least one guide roller 34 and 35, which guide rollers roll along at the side walls of the belts 11 and 14 and thus the combs 30 and 31 follow the instantaneous position of the ribs 12 and 15 transversely to the conveying direction.

Figure 4:
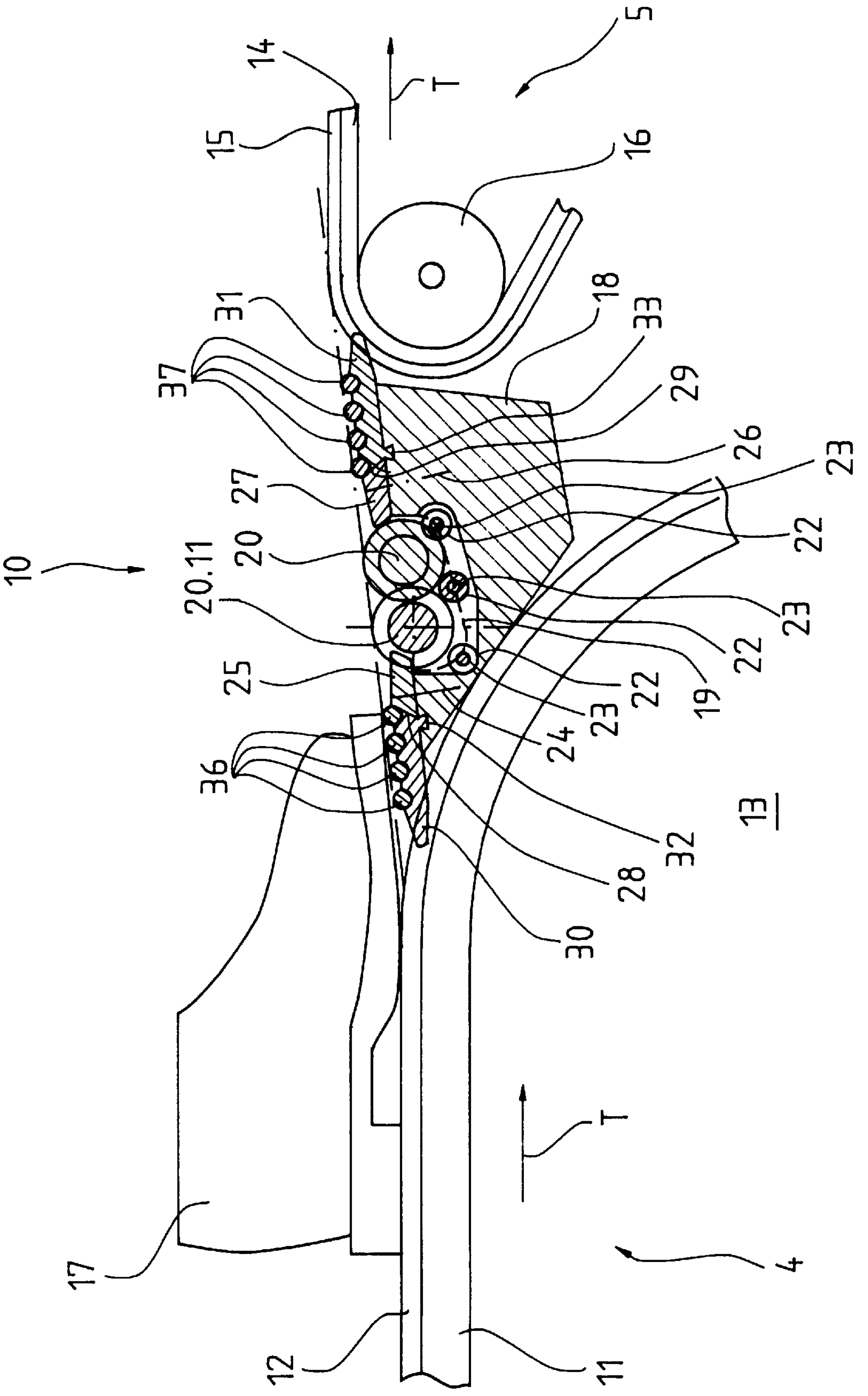
FIG. 4 is a view in partial cross-section taken along the line B—B in the FIG. 5 showing an alternate transition device with two comb rollers according to the invention.

As shown in the FIG. 2 and the FIG. 4, the shoe 17 is pushed at the inlet side from the first belt 11 to the first comb 30, which is equipped with for example rotatable first cylinder rollers 36, and further on to the first comb roller 20 or the second comb roller 20.11. The driven first comb roller 20 and the second comb roller 20.11 push the shoe 17 at the outlet side further on to the fourth comb 31, which is equipped with for example rotatable second cylinder rollers 37, and further on to the second belt 14, which draws the shoe 17 off the second cylinder rollers 37. The spacing between the first belt 11 and the first comb roller 20 or the second comb roller 20.11 is so small that even a child's shoe 17 is moved on by the first comb roller 20 or the second comb roller 20.11 before it leaves the first belt 11. The child's shoe is moved on by the first comb roller 20 or the second comb roller 20.11 for at least as long until it has reached the second belt 14.

In the case of longer transition devices 10, the cylinder rollers 36 and 37 are also driven and actively convey the shoe 17 like the first comb roller 20 or the second comb roller 20.11. The cylinder rollers 36 and 37 can also be arranged at the second comb 25 and the third comb 27.

The transition device 10 is arranged to be slightly inclined towards the first belt 11, so that the first comb 30 lies somewhat lower than the fourth comb 31.

In the case of belts without meshable ribs, the inclined arrangement of the transition device 10 reduces the risk of jamming at the inlet of the transition device 10. In the case of belts as shown in present embodiment, the transition device 10 can also be arranged horizontally, wherein the surface of the second belt 14 lies at the same height as the surface of the first belt 11.

In summary, the conveyor belt 1 for persons includes at least two of the adjacent sections 2, 3, 4, 5, 6 for transporting persons and objects from one of the sections to an adjacent one of the sections in the direction of travel T; and the transition device 10 positioned between the one section and the adjacent section, the transition device including at least one of the rotatable rollers 20, 20.11, 36, 37 extending traverse to the direction of travel whereby shoes 17 of every size of persons to be transported and objects roll upon the roller from the one section to the adjacent section.

In accordance with the provisions of the patent statutes, the present invention has been described in what is considered to represent its preferred embodiment. However, it should be noted that the invention can be practiced otherwise than as specifically illustrated and described without departing from its spirit or scope.

What is claimed is:

1. In a conveyor belt for persons including at least two adjacent sections for transporting persons and objects in a direction of travel from one of said sections to an adjacent one of said sections, a transition device having an inlet side and an outlet side, said transition device comprising:

at least one comb roller, said at least one comb roller rotatably positioned between said one of said sections and said adjacent one of said sections, at least one comb having at least one roller mounted at said inlet side of said transition device, said at least one comb connected to at least one guide roller engaging side walls of said one of said sections; and at least one other comb having at least one other roller mounted at said outlet side of said transition device, said at least one other comb connected to at least one other guide roller engaging side walls of said adjacent one of said sections.

2. The transition device according to claim 1 wherein said at least one comb roller is a driven comb roller.

3. The transition device according to claim 1 wherein said at least one roller associated with said at least one comb is a cylinder roller.

4. The transition device according to claim 1 wherein said at least one other roller associated with said at least one other comb is a cylinder roller.

5. The transition device according to claim 1 wherein said at least one comb and said at least one other comb mesh with and are mounted on opposite sides of said at least one comb roller.

6. The transition device according to claim 1 wherein said comb roller is driven at a rotation speed between a speed of said one of said sections and said adjacent one of said sections.

7. The transition device according to claim 1 wherein an end of said one of said sections adjacent said inlet side of said transition device is lower than said adjacent one of said sections at said outlet side of said transition device and said transition device is inclined toward said adjacent one of said sections at said outlet side of said transition device.

8. The transition device according to claim 2 having one driven comb roller.

9. The transition device according to claim 2 having at least two meshing driven comb rollers.

10. In a conveyor belt for persons including at least two adjacent sections for transporting persons and objects in a direction of travel from one of said sections to an adjacent one of said sections, a transition device having an inlet side and an outlet side, said transition device comprising:

at least one driven comb roller, said at least one driven comb roller rotatably mounted in a recess in a support positioned between said one of said sections and said adjacent one of said sections, said driven comb roller extending transverse to the direction of travel whereby shoes of every size of persons to be transported and objects roll upon said at least one driven comb roller;

at least one comb having at least one cylinder roller mounted at said inlet side of said transition device transverse to said direction of travel, said at least one comb connected to at least one guide roller engaging side walls of said one of said sections; and at least one other comb having at least one other cylinder roller mounted at an outlet side of said transition device transverse to said direction of travel, said at least one other comb connected to at least one other guide roller engaging side walls of said adjacent one of said sections.

11. The transition device according to claim 10 wherein said at least one comb and said at least one other comb mesh with and are mounted on opposite sides of said driven comb roller.

12. The transition device according to claim 10 wherein said driven comb roller is driven at a rotation speed between a speed of said one of said sections and said adjacent one of said sections.

13. The transition device according to claim 10 wherein an end of said one of said sections adjacent said inlet side of said transition device is lower than said adjacent one of said sections at said outlet side of said transition device and said transition device is inclined toward said adjacent one of said sections at said outlet side of said transition device.

14. The transition device according to claim 10 having one driven comb roller.

15. The transition device according to claim 10 having at least two meshing driven comb rollers.

* * * * *